March 19, 1963 W. J. GREENE 3,082,316
ELECTRON BEAM WELDING
Filed April 12, 1960 5 Sheets-Sheet 1

FIG. 1

INVENTOR.
WILLIAM J. GREENE
BY
ATTORNEY 3,082,316
Patented Mar. 19, 1963

3,082,316
ELECTRON BEAM WELDING
William J. Greene, Scotch Plains, N.J., assignor to Air Reduction Company, Incorporated, New York, N.Y., a corporation of New York
Filed Apr. 12, 1960, Ser. No. 21,701
13 Claims. (Cl. 219—117)

This invention is an improvement on the invention described and claimed in my copending application Serial No. 835,726, filed August 24, 1959, for Electron Beam Welding. That application discloses a method and apparatus for electron beam welding including a casing which may be opened to the atmosphere for the insertion of a workpiece, a pump for evacuating the casing, and a novel form of electron gun which is operable after evacuation of the casing to direct a high density beam of electrons to a locality on the workpiece where a weld is desired.

Experience with the apparatus disclosed in my copending application has revealed the existence of certain problems. One such problem has been the occurrence, with some workpieces, of arc discharges in the place of the electron beam, or a portion of the beam.

In any apparatus involving two spaced electrodes separated by a gaseous medium through which an electric discharge takes place, the quality or type of discharge may vary, depending principally on two factors, namely the pressure of the gaseous medium and the potential between the two electrodes. For any given potential, a discharge which takes the form of an electron beam at very low pressures (high vacuums) may change to an arc discharge if the pressure of the gaseous medium becomes high enough so that ionizable particles are present in sufficient quantity to sutain an arc. The production of a high density, high velocity electron beam having energy sufficient for welding operations requires the use between electrodes of direct potentials of the order of 10,000 volts. For example, in the apparatus described in my copending application, a potential of 10,000 volts is used between the electron emitting cathode and the accelerating anode. A further potential difference of 5,000 volts is used between the accelerating anode and the workpiece. When the high density electron beam heats the workpiece to welding temperatures, there sometimes occurs a gaseous discharge from the workpiece which may raise the pressure inside the casing of the welding apparatus. Such discharges are due to gaseous or vaporizable materials occluded in the workpiece, which are expanded or vaporized by the heat of the weld. While the casing is continuously evacuated by a pump, nevertheless, the gaseous discharge from the workpiece may be sufficiently great to raise the pressure substantially for a fraction of a second. This increase in pressure may be sufficient so that an arc discharge may develop between the electrodes or between one electrode and the workpiece, instead of the desired electron beam. Such an arc discharge may damage the workpiece or the electrodes, or other parts of the electron gun structure.

An object of the present invention is to provide electron beam welding apparatus including an electron gun, a workpiece, and means for preventing gaseous discharges arising at the workpiece from raising the pressure adjacent the electrodes of the electron gun sufficiently to cause an arc.

Another object of the invention is to provide electron beam apparatus including separate chambers for the work material to be processed and the electron gun, and means separating the chambers which allows passage of the electron beam from the gun chamber to the work chamber, but inhibits the transfer of gas particles from the work chamber to the gun chamber.

A further object is to provide electron beam apparatus of the type described wherein the means separating the work chamber and the electron beam chamber comprises a diaphragm having an aperture through which the beam is directed, the diameter of the aperture being less than the mean free path of gaseous particles in the work chamber.

Another object is to provide, in electron beam welding apparatus of the type described, means for maintaining the gun chamber at a pressure lower than the workpiece chamber and cooperating with the chamber separating means so that while gases evolved at the workpiece may raise the pressure in the workpiece chamber, the flow of those gases to the gun chamber is inhibited sufficiently to prevent effectively the establishment of an arc discharge.

Another object of the invention is to provide a method and apparatus of the type described including means for converging the beam to a small diameter at the aperture and means for automatically controlling the convergence of the beam as it approaches the aperture, so as to keep the beam within the aperture.

Another object of the invention is to provide a method and apparatus for electron beam welding, including means for controlling the beam diameter so as to keep it substantially constant at an optimum value.

The foregoing and other objects of the invention are attained in the method and apparatus described herein. That apparatus is enclosed in a casing divided by a diaphragm into two chambers, namely a workpiece chamber to and from which the workpieces are supplied and removed, and an electron gun chamber, in which the electron beam is generated. The two chambers are maintained at different pressures during a welding operation. A pressure of the order of 0.05 micron of mercury is maintained in the electron gun chamber, while a higher pressure (of the order of 5 microns of mercury) is maintained in the workpiece chamber. The two chambers are separated by a diaphragm having a small aperture through which the electron beam passes. The diameter of the aperture in the diaphragm must be less than the mean free path of the gas or other atoms or molecules present in the workpiece chamber. That mean free path is determined by the workpiece chamber pressure. If that relationship of the diaphragm aperture diameter to the mean free path is maintained, then the aperture acts as a diffusion barrier rather than a hole permitting normal fluid flow between the two chambers, and it becomes feasible to maintain the two chambers at different pressures, as described. This may be done, for example, by means of two separate pumps, one for each chamber. Diffusion from the high pressure chamber into the low pressure chamber is further reduced by the presence of the high density electron beam moving through the diaphragm aperture toward the high pressure chamber.

The diaphragm may be made electrically positive with respect to the workpiece, so as to repel positively charged particles, thereby further reducing diffusion.

The electron beam must be converged against the expansive effect of its own space charge, in order to pass through the aperture in the diaphragm. This convergence is secured by an electromagnetic focusing coil similar to that described in my copending application, where such a coil is used to focus the beam on the workpiece. In the apparatus described herein, the beam expands immediately after passing through the diaphragm aperture, and must be refocused by a second electromagnetic coil in order to form a high density spot at the workpiece for welding purposes.

The location of the periphery of the beam at the diaphragm aperture may be sensed by any of several mechanisms disclosed herein. The sensing mechanism may produce an electrical signal which is transmitted to apparatus for controlling the field strength of the focusing coil. The coil is controlled to maintain the beam diameter at a minimum value. Alternatively, the electrical signal may actuate a visual signal or a meter, so that an operator may control the beam diameter manually.

In the preferred form of the invention the diaphragm is electrically conductive and is connected to ground through an impedance network. The diaphragm is maintained at a background potential substantially different from the potential of the electron beam as it passes through the aperture in the diaphragm. An alternating component of relatively small magnitude is superimposed on the field of the focusing coil so that the convergence of the beam, and hence its diameter at the diaphragm aperture, varies at the frequency of the alternating component. The diaphragm is directly or capacitively coupled to the beam, and an alternating current flows through the beam and network from the beam. This current varies directly as the beam diameter. It is desired to keep the minimum diameter of the beam at the aperture in the diaphragm. The beam may depart from this condition if the focusing field is too strong or too weak. If the field is too strong, the beam converges too sharply and the minimum diameter appears ahead of the diaphragm. If the field is too weak, the beam does not converge sharply enough and the minimum diameter appears after the beam passes the diaphragm. As is explained more fully hereinafter, when the beam is at its diameter, the alternating signal picked up by the diaphragm is at a minimum value. If the focusing field is too strong, the diaphragm picks up an alternating signal of one phase and if the field is too weak, the diaphragm picks up an alternating signal of the opposite phase. The phase may be readily detected and used to control means for varying the strength of the focusing field in the proper sense to restore the minimum diameter of the beam to its optimum position in the aperture of the diaphragm.

In a modification, the alternating current field may be omitted, and the diameter of the beam may be sensed by two rings concentric with the aperture and supported on the diaphragm, but insulated therefrom and located on opposite sides thereof. If the beam impinges on one or the other of the rings, that impingement may be utilized to produce a signal effective to actuate apparatus for varying the strength of the focusing field in one sense or the other so as to restore the beam to its minimum diameter condition and prevent the beam from impinging on the ring.

According to another feature of the invention, the automatic control of the focusing field may be employed to control the refocusing field and thereby to facilitate the control of the weld quality.

Other objects and advantages of the invention will become apparent from a consideration of the following specification and claims, taken together with the accompanying drawings.

Figure 1:
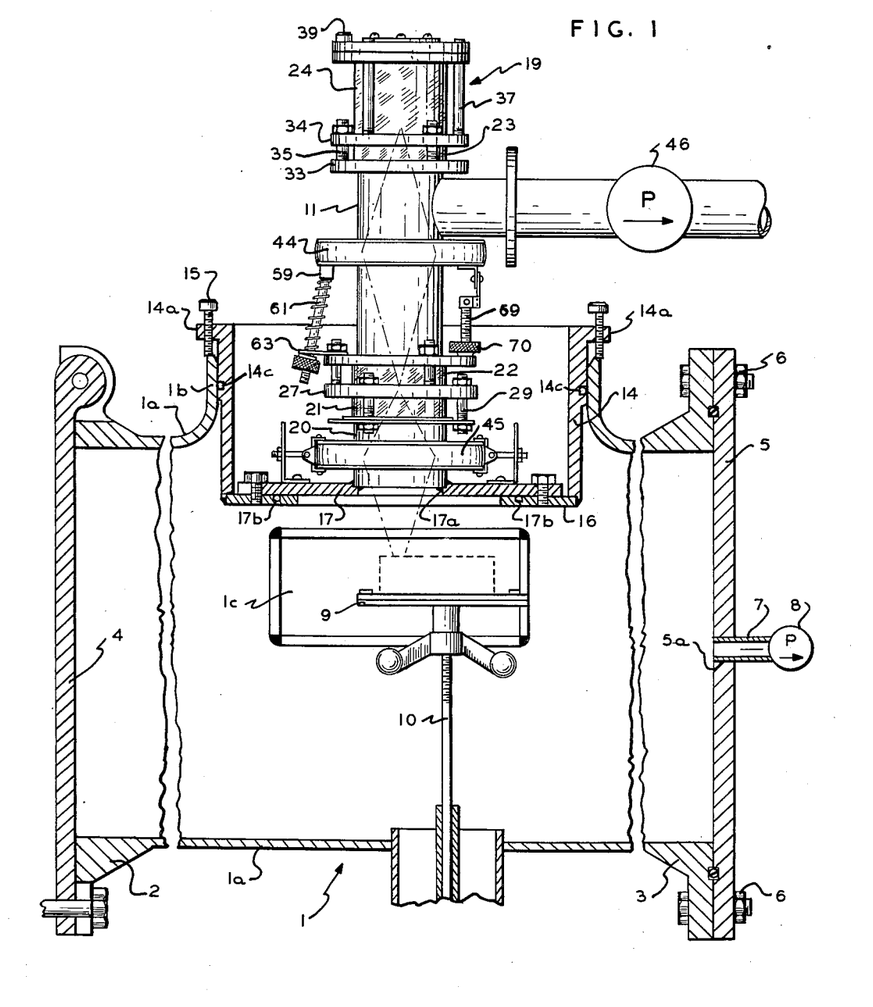
FIG. 1 is a vertical cross-sectional view of electron beam welding apparatus constructed in accordance with the invention.

The electron beam welding apparatus illustrated in the drawings includes a housing generally indicated by the reference numeral 1 and consists of a standard stainless steel pipe T, including a main conduit 1a and a branch conduit 1b opening into the main conduit. The respective ends of the main conduit 1a are provided with coupling flanges 2 and 3. The coupling flange 2 is closed by a hinged door 4. The coupling flange 3 is shown as being closed by a plate 5 held in place by bolts 6. The plate 5 has an aperture 5a connected through a suitable conduit 7 to a vacuum pump diagrammatically illustrated at 8 which should have a sufficient capacity to be able to lower the pressure inside the casing 1 from atmospheric pressure to one micron of mercury within a reasonable time.

Opposite the opening of the branch conduit 1b, there is provided a support 9 for a workpiece or workpieces to be welded. The support 9 is shown as being mounted on a shaft 10 which extends through a suitable seal in the bottom of the housing 1, and may be driven by suitable mechanism (not shown) located outside the housing. The particular form of workpiece driving apparatus is not material to the present invention.

There may be provided in one or both sides of the main conduit 1a a viewing port or window such as that shown at 1c, which may be constructed of ordinary glass, providing it is strong enough to withstand the pressure differential. If the electron beam potential is below 15,000 volts, then the X-rays produced at the weld point will be blocked by ordinary glass, and the weld can be readily observed through such a port. If the electron beam potential is increased above 15,000 volts, leaded glass or other protective measures must be taken.

A tubular member 14 is telescoped within the branch conduit 1b. An O-ring seal 14c is provided between the tubular member 14 and branch conduit 1b. The tubular member 14 is provided at its upper end, as it appears in the drawing, with an outwardly projecting flange 14a, through which are threadedly inserted a plurality of bolts 15 whose lower ends abut the end of the branch conduit 1b. The bolts 15 are adjustable to move the tubular member in and out of the branch conduit, so as to vary its vertical position therein. The inner end of the tubular member 14 is partly closed by an annular plate 16 and supports at its center an electron gun generally indicated by the reference numeral 19. The mounting plate 17 is of non-magnetic material, e.g., brass. The tubular member 14 and the annular plate 16 may be steel. The non-magnetic plate 17 is provided with a central aperture 17a. An O-ring seal 17b is provided between the plates 16 and 17.

Figure 2:
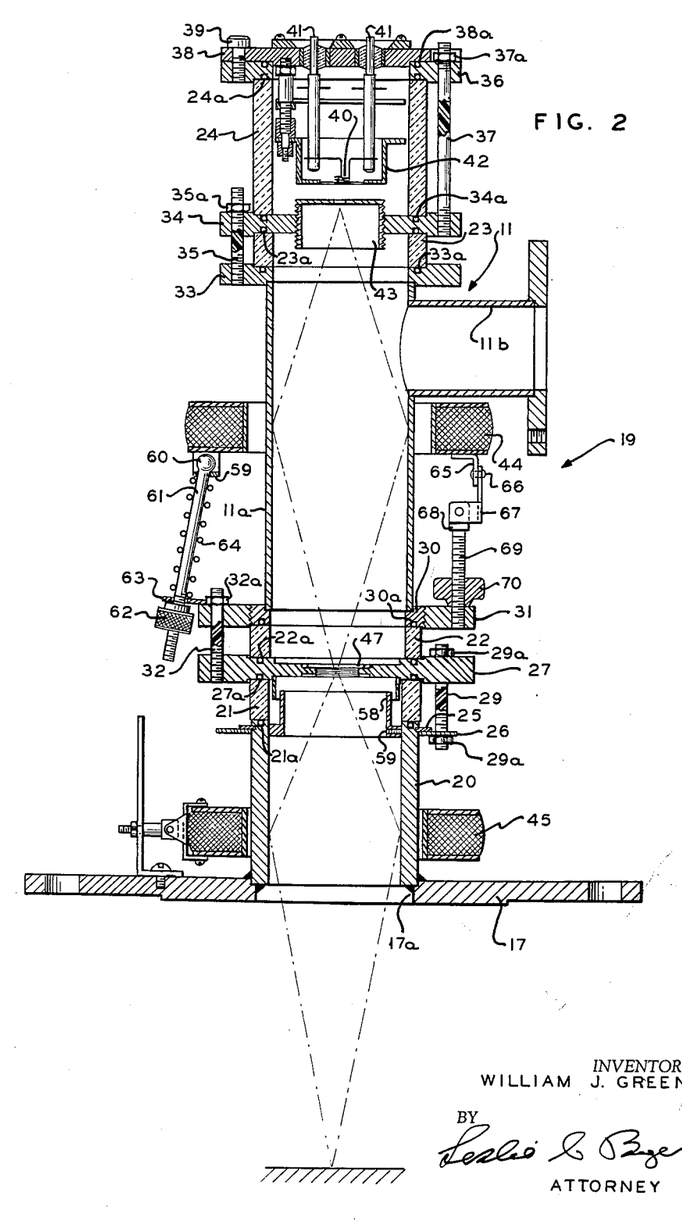
FIG. 2 is a fragmentary view similar to FIG. 1, but on a larger scale, showing the electron gun and diaphragm construction.

The electron gun 19, shown in greater detail in FIG. 2, comprises a stack of cylindrical elements including cylinders 20, 21 and 22, the main conduit 11a of a second pipe T 11 and two additional cylinders 23 and 24. Cylinder 20 and pipe T 11 are of non-magnetic metal, e.g., brass, to avoid the possibility of stray fields which might affect the electron beam focusing. Cylinder 20 is brazed at its lower end to the plate 17 at the periphery of the aperture 17a. The cylinder 21 is of insulating material, e.g., glass, and rests on the top of cylinder 20. An O-ring seal is provided between the cylinders 20 and 21 as shown at 21a. A split ring clamp 25 is received in a suitable slot in the outer surface of the cylinder 20 near the top thereof. A flat ring 26 abuts the under surface of the split ring 25. A flat diaphragm plate 27 of non-magnetic metal, e.g. brass, rests on the top of the cylinder 21. The diaphragm plate 27 projects outwardly beyond the cylinders 21 and 22. Around the outer periphery of plate 27 there are provided a plurality of apertures for receiving threaded rods 29 of insulating material, e.g., nylon, which extend through the ring 26. Nuts 29a cooperate with both ends of the rods 29 to clamp the plate 27 and the ring 26 together and maintain the O-ring seals 27a and 21a under compression.

The cylinder 22 is also of insulating material, e.g., glass. An O-ring seal 22a is provided between the cylinder 22 and plate 27. The upper end of the cylinder 22 abuts a brass ring 30, and O-ring seal 30a being provided between the cylinder 22 and the ring 30. The ring 30 is welded or compressed to one end of the main conduit 11a of the pipe T 11. Another ring 31, which may also be brass, is internally threaded to engage external threads on the ring 30. A plurality of threaded nylon rods 32 are threaded into the diaphragm plate 27 and extend through apertures in the ring 31. Nuts 32a cooperate with the rods 32 to hold the rings 30 and 31 and diaphragm plate 27 tightly clamped against the ends of the cylinder 22.

The upper end of the main conduit 11a of the pipe T 11 is welded to a ring 33 similar to the ring 30, but of a larger outside diameter. The cylinder 23 abuts against the upper side of ring 33, the joint being sealed by an O-ring seal 33a. An annular plate 34 abuts against the upper end of cylinder 23, the joint between plate 34 and cylinder 23 being sealed by an O-ring 23a. A plurality of threaded nylon rods 35 extend through apertures in the plate 34 and are threaded into internally threaded apertures in the plate 33. Nuts 35a cooperate with the rods 35 to hold the plate 34 and the ring 33 tightly clamped against the ends of the cylinder 23.

The lower end of cylinder 24 abuts against the upper side of plate 34. An O-ring seal 34a is provided to seal the connection. Another ring 36 abuts against the upper end of the cylinder 24. An O-ring seal 24a is provided to seal the connection. A plurality of threaded nylon rods 37 extend through the plate 36 and are threaded into apertures in plate 34. Nuts 37a cooperate with the bolts 37 to hold the ring 36 and plate 34 tightly against the ends of the cylinder 24. A plate 38 closes the upper side of the ring 36, being held thereon by a plurality of bolts 39. An O-ring seal 38a is provided between the plate 38 and the ring 36. Rings 31, 33, 34 and 36 and plate 38 are all of non-magnetic metal, e.g., brass.

Electron gun 19 includes a cathode filament 40 supported on two electrically conductive posts 41, which extend through and are insulatingly supported by the plate 38. The gun 19 also includes a control electrode 42 supported by suitable studs of insulating material, e.g., nylon, extending downwardly from the plate 38, and accelerating anode 43 mounted on the plate 34, a first electromagnetic focusing coil 44 tiltably mounted on the ring 31 and a second electromagnetic focusing coil 45 tiltably mounted on the plate 17.

The pipe T 11a has a branch conduit 11b which may be connected to a diffusion pump 46, shown diagrammatically in FIG. 1, and having a capacity sufficient to reduce the pressure within the housing and above the diaphragm plate 27 to 0.05 micron of mercury.

While the pump 8 and the pump 46 have each been shown diagrammatically as single pumps, it will be well understood by those skilled in the art of producing high vacuum conditions that a more elaborate pumping arrangement is necessary. Two or three pumps connected in series are typically used in place of each of the pumps 8 and 46. For example, a mechanical pump may be used which delivers to atmospheric pressure and has its inlet maintained at a pressure of the order of a few centimeters of mercury by a booster pump which in turn maintains its inlet at 10 microns of mercury. The booster pump may be in turn fed by a diffusion pump, connected directly to the workpiece chamber of the weld apparatus.

At the start of the welding operation, the pumping system, diagrammatically indicated at 8, should be set to hold the pressure in the workpiece chamber at 0.1 micron. The pressure in this chamber can go up to 10 microns without adversely affecting the weld or the pressure in the electron gun chamber. The pressure in the workpiece chamber during a typical welding operation goes up because of gas vaporized through or released from the workpiece, and is usually somewhere in the range of 1 to 10 microns at the end of the welding operation.

It has been found desirable to use 5 centimeters as the maximum beam diameter in the electron lenses within the coils 44 and 45. If that maximum diameter is held, the diameter of the focused spot at the workpiece and in the orifice opening 48a can be held in a range from 0.7 mm. at a current of a fraction of an ampere to about 2½ mm. at ½ ampere.

Figure 3:
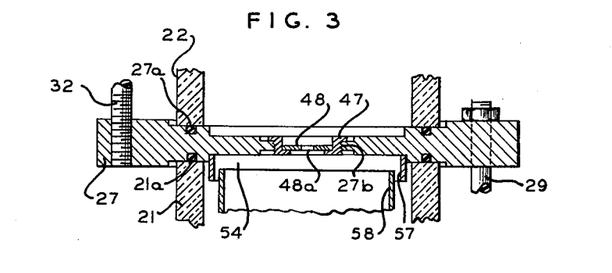
FIG. 3 is a fragmentary view, similar to FIGS. 1 and 2, but showing the details of the diaphragm structure.

The details of construction of the diaphragm plate 27 are shown in FIG. 3 on an enlarged scale. The diaphragm plate 27 has an internally threaded opening 27b in its center. An externally threaded cup 47 is inserted in the opening 27b. The cup 47 has an inwardly projecting flange on its under side for receiving and supporting a diaphragm 48. The diaphragm 48 has an aperture 48a formed in its center. This aperture 48a is the one through which the electron beam must pass. Diaphragm 48 may be formed of tungsten, which is highly resistant to damage by impingement of the electron beam.

Because of the high energy content of the electron beam any part or article upon which it impinges is likely to be either melted or vaporized, depending upon its physical characteristics. By making the diaphragm 48 part of a removable and replaceable structure, i.e., the cup 47, it is easy to provide a new diaphragm in case of accidental impingement of the beam on the diaphragm 48, which may either destroy the diaphragm or enlarge the aperture undesirably.

The space inside the casing 1 and below the diaphragm plate 27 is hereinafter referred to as the work-piece chamber. This space may be quite large depending principally upon the size of the workpieces which it is desired to handle in a particular apparatus. The space inside the sealed assembly and above the diaphragm plate 27 is hereinafter referred to as the electron gun chamber. The volume of this chamber is relatively small, since it only needs to be large enough to enclose the operating parts of the electron gun.

As pointed out above, during each welding operation, the pressure in the workpiece chamber should be reduced to a pressure of the order of 5.0 microns of mercury, whereas the pressure in the electron gun chamber must be reduced to a much lower pressure, of the order of 0.05 micron of mercury. It may be seen that the electron gun chamber is connected to the workpiece chamber through the aperture 48a. If the diameter of the aperture 48a is made smaller than the mean free path of the particles in the workpiece chamber, then the diaphragm 48 and aperture 48a take on the characteristics of a diffusion barrier rather than an opening or orifice subject to normal flow conditions. There is some diffusion through the aperture 48a, but the diffusion rate is slow enough so that the pressure in the electron gun chamber can be readily maintained at its low level by means of the diffusion pump 46. For the two pressures suggested above for the respective chambers, it has been found that an aperture having a diameter of 3/32 inch (0.24 centimeter) is satisfactory and that the pressure differential may be readily maintained throughout the welding operation.

The diffusion of atoms or molecules from the workpiece chamber through the aperture 48a is further reduced by the existence of the electron beam consisting of highly charged particles moving downwardly through the aperture. The electrons in this beam tend to collide with any particles moving upwardly through the aperture, and thus reduces the number of particles which move from the workpiece chamber to the electron gun chamber.

A cylindrical shield or panel plate 57 is fixed to the under side of the diaphragm 27 and extends downwardly therefrom, being spaced inwardly a short distance from the cylinder 21. Another shield or panel plate 58, also of cylindrical contour, but of smaller diameter than the shield 57, is concentric with the lower portion of the shield 57 and is supported on the inside of the cylinder 20 by means of a set screw 59 (see FIG. 2). The shields 57 and 58 are provided to prevent deposit of electrically conductive materials which may sputter or vaporize from the welded point and which might otherwise be deposited on the inner surface of the insulating cylinder 21, thereby short circuiting the diaphragm plate 27 to the cylinder 20.

Each of the two electromagnetic focusing coils 44 and 45 is mounted for tilting movement about either of two mutually perpendicular axes, both of which axes are perpendicular to the axis of the electron gun. The particular form of this tiltable supporting structure is not material to the present invention, since it is obvious that various types of tilting supports may be used. For example, a suitable tilting support is described in some detail in my copending application Serial No. 835,726 mentioned above. The support for the coil 44 will be described briefly to provide another example. The left hand side of the coil 44, as it appears in the drawing, is provided on its under side with a socket 59 which rotatably receives a ball 60 connected to an arm 61 whose opposite end is threaded and provided with a knurled nut 62. A washer 63 encircles the arm 61 above the nut 62, and has an extension adapted to engage the upper side of the ring 31. A coil spring 64 encircles the arm 61 and holds the washer 63 tightly against the nut 62.

The right hand side of the coil 44 is provided on its lower surface with an angle bracket 65, whose lower end is attached by a pivot pin 66 to the upper end of a link 67. The lower end of link 67 is pivoted on a head 68 carried on the upper end of a bolt 69 threadedly mounted in the ring 31. The nut 62 and the bolt 69, with its cooperating nut 70, provide for tilting movement of the coil 44 about an axis perpendicular to the plane of the paper and to the axis of the electron gun. The ball and socket joint 59, 60 and the pivotal connection between link 67 and head 68 permit this tilting movement of the coil while the nuts 62 and 70 serve to fix the coil in any desired angular position.

The pivot pin 66 and the universal joint 59, 60 permit tilting movement of the coil 44 about an axis lying in the plane of the paper and at right angles to the axis of the electron gun. Fastening devices similar to the nuts 62 and 70 may be provided for fixing the coil about that axis.

Figure 4:
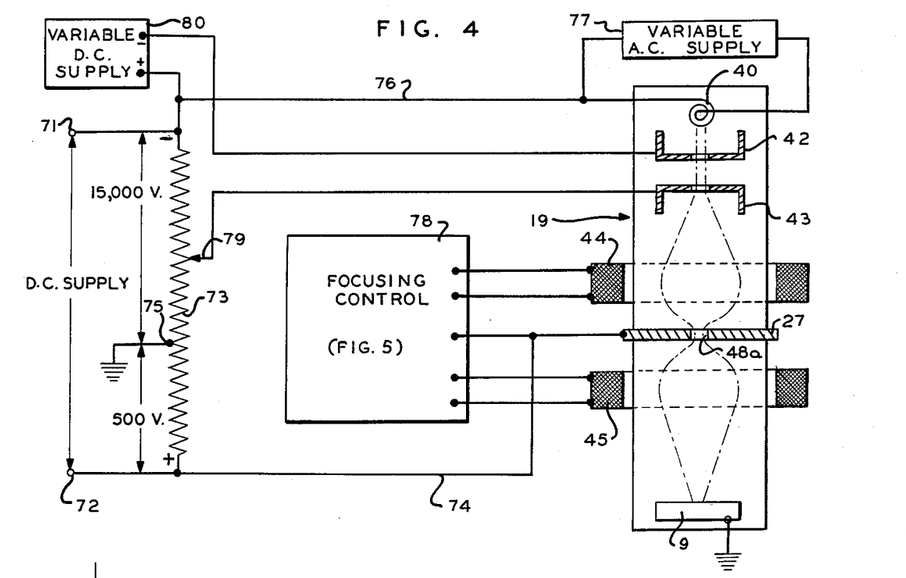
FIG. 4 is a wiring diagram showing the electrical power and potential supply connections to the various elements of the electron gun other than the focusing apparatus.

*FIGURE 4*

This figure is an electrical wiring diagram illustrating the principal current and potential supplies for the elements of the electron gun 19 other than the focusing coils 44 and 45. The power supply for those coils is shown in greater detail in FIG. 5.

The principal feature of novelty shown in this figure is the potential supply for the diaphragm plate 27. A source of direct current having a potential of 15,500 volts is connected between terminals 71 and 72. A voltage dividing resistor 73 is connected between those terminals. The positive terminal 72 is connected to the diaphragm plate 27 by wire 74. An intermediate point 75 on the resistor 73 is connected to ground so that the potential of terminal 72 is 500 volts positive with respect to ground and the potential of terminal 71 is 15,000 volts negative with respect to ground. Negative terminal 71 is connected through wire 76 to the cathode 40. The workpiece support 9 is connected to ground. The electrons released at the cathode 40 therefore have applied to them an accelerating potential of 15,000 volts. The positive potential of 500 volts applied to the diaphragm plate 27 tends to repel any positively charged particles within the workpiece chamber which are moving toward the aperture 48a. Most of the metallic particles produced by the welding action, whether they are in the form of vapor or liquid (sputtering) are positively charged. Consequently, the positive potential on the diaphragm plate 27 tends to repel such charged particles away from the aperture 48a, thereby keeping them out of the electron gun chamber and assisting in maintaining a lower pressure in that chamber than in the workpiece chamber.

The terminals of the cathode 40 are connected to the terminals of a heating current supply 77 which may be the same as that shown in my copending application Serial No. 835,726. The accelerating anode 43 is connected to a slider 79 movable along the resistor 73. The control electrode 42 is connected to the negative terminal of a variable potential direct current supply 80, whose positive terminal is connected to terminal 71. The winding of coil 44 is connected to a focusing control shown diagrammatically at 78 and illustrated in detail in FIG. 5. The winding of coil 45 and the diaphragm plate 27 are connected to other terminals on the focusing control 78.

Figure 5:
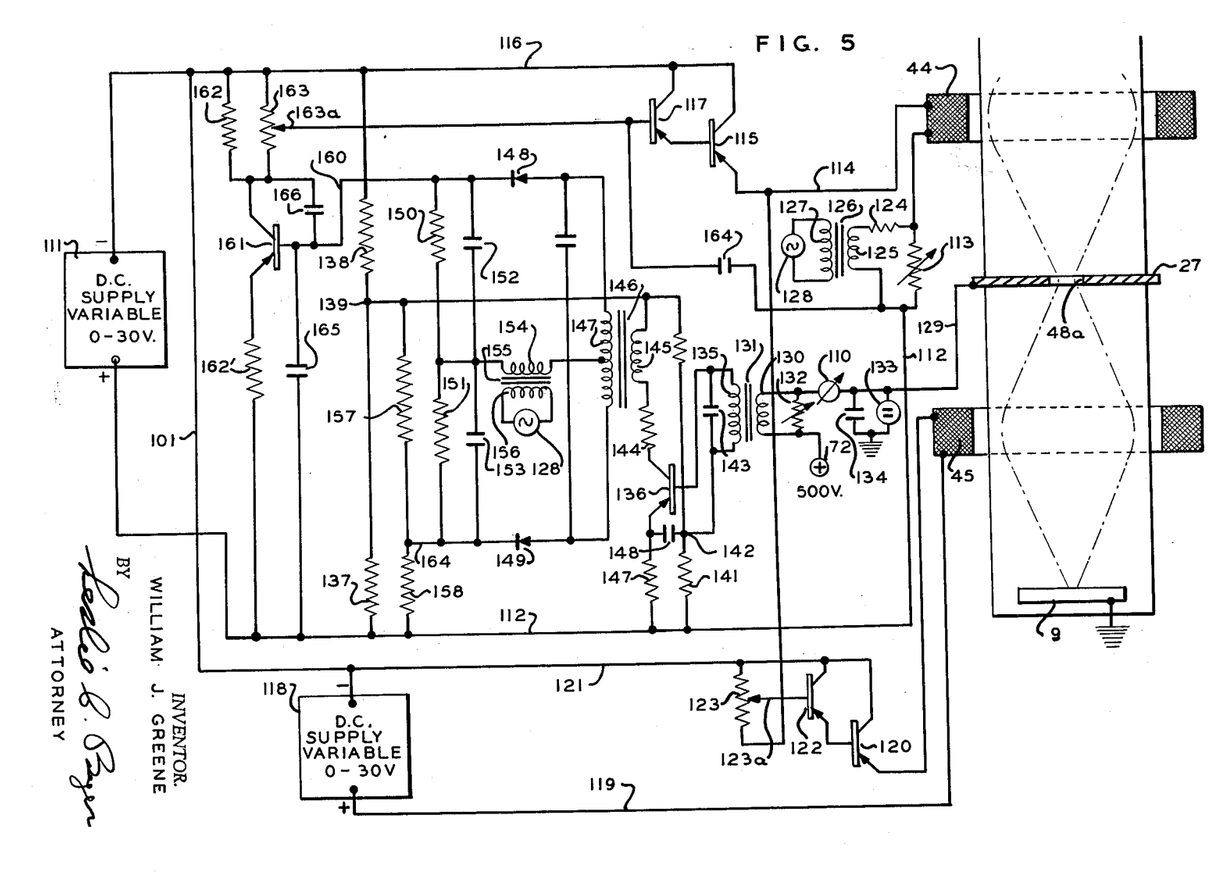
FIG. 5 is a wiring diagram complementing FIG. 4 and illustrating a preferred form of power supply for the focusing coils and an automatic focusing control constructed in accordance with the invention.

*FIGURE 5*

This figure is a wiring diagram of the circuits for supplying current to the focusing coils 44 and 45. As mentioned above, these circuits include an automatic focusing control, by which the current supplied to the coils 44 and 45 is controlled in accordance with a signal received at the diaphragm 27. Provision is also made for measuring the current flow between the diaphragm 27 and ground by means of an ammeter 110. If for any reason the automatic focusing control becomes inoperative, an operator may watch the ammeter and use the information obtained from it so that he may manually control the supply of current to the coils 44 and 45.

The current for coil 44 is supplied from a suitable direct current source 111 having a terminal voltage which is manually variable between zero and 30 volts. The energizing circuit for coil 44 may be traced from the positive terminal of source 111 through a wire 112, a variable resistor 113, coil 44, wire 114, the emitter and collector of a transistor 115, and a wire 116 to the negative terminal of the source 111. The base of transistor 115 is connected to the emitter of another transistor 117, whose collector is connected to wire 116.

The current supply for coil 45 is obtained from a suitable direct current supply 118 whose terminal potential is also variable between zero and 30 volts. The energizing circuit for coil 45 may be traced from the positive terminal of source 118 through a wire 119, coil 45, the emitter and collector of a transistor 120, and a wire 121 to the negative terminal of source 118. The base of transistor 120 is connected to the emitter of a transistor 122, whose collector is connected to the wire 121. A resistor 123 is connected between the wire 121 and the wire 114. A slidable tap 123a movable along the resistor 123 is connected to the base of transistor 122. The negative wires 116 and 121 of the two sources 111 and 118 are interconnected by a common wire 101.

The current flow through the coil 44 is determined by a control signal supplied to the base of transistor 117. The connection from wire 114 through resistor 123 and tap 123a supplies a similar control signal to the transistor 122, thereby controlling the current flow to coil 45. Consequently, any increase or decrease in the current flow in coil 44 causes a parallel increase or decrease in the current flow in coil 45. The current flow in coil 45 may also be manually adjusted by means of the slider 123a.

An alternating component is superimposed on the magnetic field of the coil 44, by impressing an alternating potential across the variable resistor 113. Resistor 113 may be varied as desired to set the amplitude of the alternating control. For this purpose, the upper terminal of resistor 113 as it appears in the drawing, is shown as being connected through a resistor 124 to the upper terminal of a secondary winding 125 of a transformer 126. The lower terminal of secondary winding 125 is connected to the lower terminal of resistor 113. The primary winding 127 of transformer 126 has its terminals connected to a suitable alternating current supply, shown diagrammatically at 128.

An alternating signal from the electron beam is electrostatically received on the diaphragm 27, and is transmitted through a wire 129 and ammeter 110 to one terminal of a primary winding 130 of a transformer 131. The other terminal of transformer winding 130 is connected to terminal 72 which is at a positive potential of 500 volts. Ammeter 110 is connected in series in the wire 129 and measures the R.M.S. value of the current flowing through that wire. A variable resistor 132 is connected between wire 129 and terminal 72 and serves to damp the primary winding 130 so as to avoid oscillations in the circuit. A neon lamp 133 is also connected between wire 129 and ground. The lamp 133 serves as a voltage limiter to protect the operator or other persons who may be near the apparatus in the event that the potential of the diaphragm 27 becomes excessively high with respect to ground. Since that diaphragm is within a very short distance of the electron beam, which is at an extremely high potential, it is possible that the beam may accidentally impinge on the diaphragm. The neon lamp is selected to have a breakdown potential slightly higher than 500 volts, which represents the normal potential between the diaphragm 27 and ground. Any higher potential appearing on the diaphragm plate 27 is shunted through the lamp 133, and does not appear in the normally low potential parts of the electrical circuit. A capacitor 134 is also connected between wire 129 and ground. It is selected to present a low impedance to parasitic oscillations in the neighborhood of 100 kilocycles, which have been found troublesome in the absence of such a capacitor.

Any alternating signal reaching the primary winding 130 is transferred to the secondary winding 135 of transformer 131. Secondary winding 135 has its upper terminal, as it appears in the drawing, connected to the base of a transistor 136. The power supply for the emitter and collector of transistor 136 is derived from the source 111 through two voltage dividers. A first voltage divider is connected between positive wire 112 and negative wire 116, and includes fixed resistors 137 and 138. A second voltage divider is connected from the common junction 139 of resistors 137 and 138 to the positive wire 112, and includes resistors 140 and 141 in series. The lower terminal of secondary winding 135, as it appears in the drawing, is connected to the common junction 142 of resistors 140 and 141.

A capacitor 143 is connected in parallel with secondary winding 135 to tune the circuit to the carrier frequency. The collector of transistor 136 is connected through a resistor 144 and primary winding 145 of a transformer 146 to the junction 139 in the first voltage divider. The emitter of transistor 136 is connected through a resistor 147 to the positive wire 112. A capacitor 148 is connected between the emitter of transistor 136 and junction 142. It may be seen that the alternating current signal reaching the primary winding 130 of transformer 131 is transferred to secondary winding 135 and is transmitted from its terminals through capacitor 148 and is impressed between the emitter and base of transistor 136. That signal is amplified by transistor 136 and impressed on the primary winding 145 of transformer 146.

Transformer 146 has a secondary winding 147 connected in a phase-detecting bridge which includes a pair of diodes 148 and 149 having their anodes connected to the opposite end terminals of winding 147, a pair of resistors 150 and 151 connected in series between the cathodes of the diodes 148 and 149, a pair of capacitors 152 and 153, respectively connected in parallel with the resistors 150 and 151, and a transformer secondary winding 154 connected between the common terminal of resistors 150 and 151 and the midpoint of transformer secondary winding 147. Secondary winding 154 is part of a transformer 155 having a primary winding 156 supplied with alternating current through the source 128 which supplies the alternating component for the coil winding 44.

A voltage divider including resistors 157 and 158 in series is connected between junction 139 and the positive supply wire 112. The common terminal of resistors 157 and 158 is connected to the cathode of diode 149. The cathode of diode 148 is connected through a wire 160 to the base of a transistor 161. The emitter of transistor 161 is connected through a resistor 162' to the positive supply wire 112. The collector of transistor 161 is connected through a fixed resistor 162 and a resistor 163 in parallel with resistor 162 and having a slider 163a cooperating with it. Slider 163a is connected to the base of transistor 117. The base of transistor 117 is coupled through a smoothing capacitor 164 to the positive supply wire 112. Another smoothing capacitor 165 is connected between wire 112 and the base of transistor 161. Still another smoothing capacitor 166 is connected between the base and collector of transistor 161.

*Operation of FIG. 5*

Figure 6:
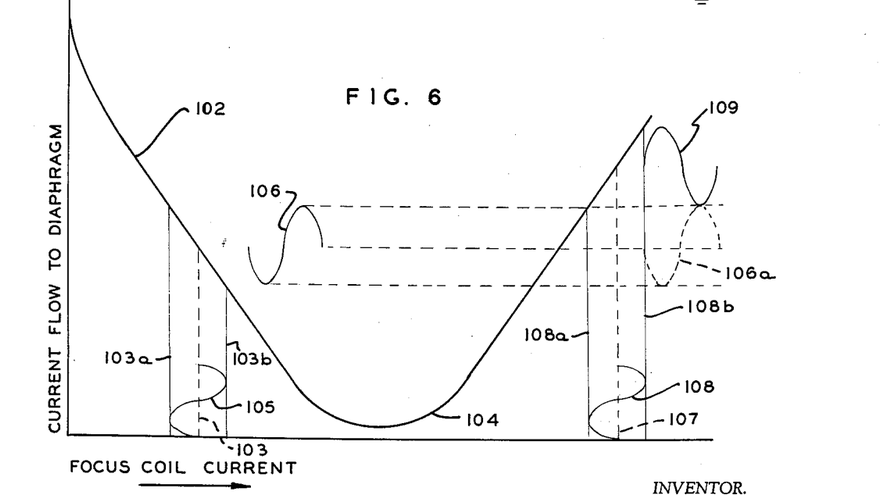
FIG. 6 is a graphical illustration of the operation of the automatic focusing control of FIG. 4.

The operation of the automatic focusing control circuit shown in FIG. 5 may be best understood by first referring to the graphical illustration in FIG. 6. In this figure, the abscissae represent direct current flowing through the focusing coil 44, and the potentials sensed by the diaphragm 27 from the beam appear as ordinates. Considering the coil 44 as having direct current flowing through it, then as the current flow is changed from zero to a positive value, the potential sensed by the diaphragm 27 follows a curve 102. This curve has a high value initially because the focus coil current is weak enough so that the electron beam impinges on the periphery of the diaphragm. As the focus coil current is increased, the contour of the electron beam becomes more convergent and the beam at the diaphragm aperture 48a becomes smaller in diameter, reducing or eliminating the area of impingement so that the diaphragm current decreases. As the focusing coil current continues to increase, a minimum value of the current at diaphragm 27 is reached. If the focus coil current is increased beyond that minimum current value, the beam contour becomes still more convergent with the smallest diameter of the beam occurring above the diaphragm so that the beam at the diaphragm aperture expands to cause an increase in the area of impingement at the aperture so that the current signal at the diaphragm increases.

When the focus coil current is at the value which gives a minimum current signal on diaphragm 27, then the narrowest part of the beam is at the aperture 48a in the diaphragm. When the focus coil current is below that particular value then the narrowest part of the beam occurs below the diaphragm. On the other hand, when the focus coil current is above that value, then the minimum diameter of the beam occurs above the diaphragm. The desired condition is to maintain the minimum diameter of the beam at or near the opening in the diaphragm.

Now assume that the current flow through the focus coil is set at some value 103, less than the minimum current value 104. The alternating component superimposed on the field produced by coil 44 produces at diaphragm 27 an alternating current, illustrated in FIG. 7 by the curve 105. The current in the field coil 44 now oscillates along the curve 102 between the points defined by the intersections thereof with the vertical lines 103a and 103b. As it oscillates, an output signal is produced at transformer winding 130, as shown by the curve 106.

This curve 106 is transferred to the right and shown in a different position in the drawing at 106a.

On the other hand, let it be assumed that the focus coil 44 has a current flow such as that indicated at 107, greater than the minimum diaphragm current flow 104. The alternating component superimposed on the main field now produces at diaphragm 27 an alternating current illustrated in FIG. 6 by the curve 108. Note that 105 and 108 are in phase. The resultant field oscillates along the curve 102 between the points defined by the intersections thereof with the vertical lines 108a and 108b. As it oscillates, an output signal is produced at transformer winding 130, as indicated by the curve 109. Comparing the curve 109 with the curve 106a immediately below it, it may be seen that the two signals produced under these two operating conditions are of the opposite phase. They may be readily compared with a fixed standard such as the phase of the source 128 in a phase detector such as the bridge including winding 147 and diodes 148 and 149.

As mentioned above, the signal appearing at transformer winding 130 is transferred to secondary winding 135, where it is impressed across the emitter and base of transistor 136, which produces an amplified signal in the transformer primary winding 145.

Referring now to the phase detecting bridge, it may be seen that when no signal appears in secondary winding 147, then the alternating potential appearing in winding 154 is rectified in the half cycles of one polarity by the diode 148. In the half cycles of opposite polarity the alternating potential is rectified by diode 149. These rectified potentials result in the building up of equal and oppositely poled charges on the capacitors 152 and 153 so that the signal then appearing between the phase detector output terminal wires 160 and 164 is then substantially zero. The potential applied to the base of transistor 161 is then determined by the voltage divider network including resistors 137 and 138, 157 and 158.

Now, if an alternating signal whose phase is the same as that in winding 154 appears in secondary winding 147, it adds to the potential of winding 154 with respect to one of the diodes 148 and 149, and opposes the potential of winding 154 with respect to the other of those two diodes. Thus, the potential built up on one of the capacitors 152, 153 is increased and the potential on the other is decreased. The phase detector network then produces an output potential which varies the current through the transistor 161 in a sense to cause a corresponding change in the current flow through transistors 117 and 115, thereby varying the current flow in the coil 44. On the other hand, if the signal produced in winding 147 opposes that of winding 154 in phase then the current flow through the other one of the two diodes 149 and 148 is increased, whereas the diode current flow which was increased before is now decreased. The output signal of the phase detector network has the opposite polarity from its previous value and causes a change in the current flow through coil 44 in the opposite sense.

The polarities of the signals from the phase detector network are arranged so that a signal such as that shown at 106 in FIG. 6 causes the current flow to increase in the coil 44 until that signal disappears. On the other hand, a signal such as that appearing at 109 in FIG. 6 causes the current flow to decrease in the coil 44 until the signal disappears. The effect is to stabilize the current in the coil 44 at the value indicated at 104 in FIG. 6, or in the immediate region of that value, where the curve 102 is at or near its minimum.

Figure 7:
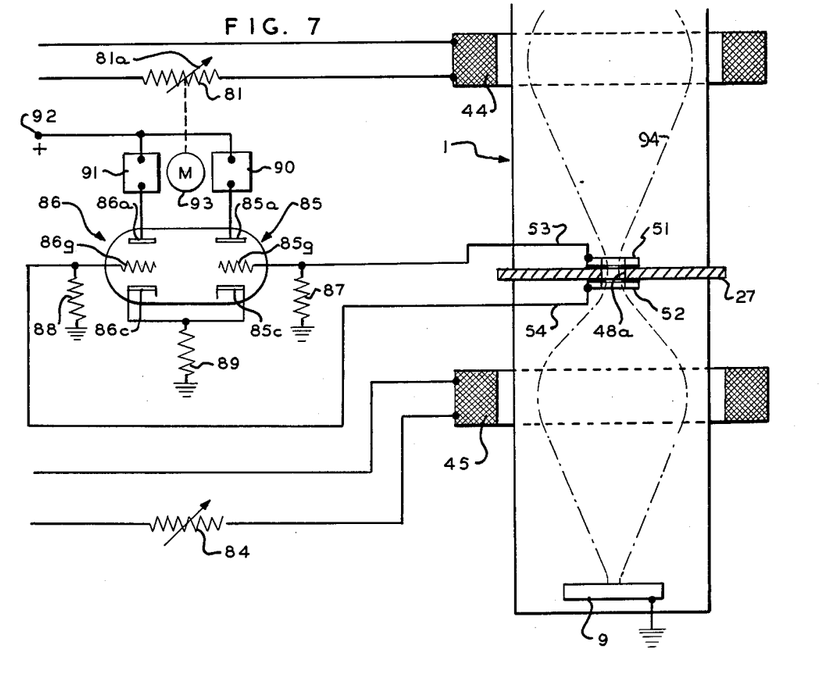
FIG. 7 is a wiring diagram illustrating a modified form of automatic focusing control.

FIGURE 7

This figure illustrates a modification of the invention including a different form of automatic focusing control. This automatic focusing control feature is disclosed in FIG. 7 with only so much of the other elements of the previous figures as is necessary to an understanding of this modification. In this figure, the diaphragm plate 27 carries sensing rings 51 and 52 which are insulated from the diaphragm plate. Sensing ring 51 is connected through wire 53 to the control grid 85g of a triode 85. Sensing ring 52 is connected through a wire 54 to the control grid 86g of a triode 86. The grids 85g and 86g are connected to ground through resistors 87 and 88. The triodes 85 and 86 have cathodes 85c and 86c which are connected together, and through resistors 89 to ground. The anodes 85a and 86a are connected through a pair of control devices diagrammatically shown at 90 and 91 to a positive current supply terminal 92. The control devices 90 and 91 form part of a reversible motor control system including a motor 92 which drives the slider 81a of the variable resistor 81.

Operation of FIG. 7

The apparatus of FIG. 7 is intended to maintain the narrowest portion of the electron beam diagrammatically shown at 94 at the aperture 48a. If the converging field of the focusing coil 44 becomes too strong, then the narrowest portion of the beam 94 will tend to shift upwardly, so that the portion of the beam having the narrowest diameter will impinge on the sensing ring 52. If the strength of the focusing field supplied by coil 44 becomes too small, then the narrow portion of the beam will shift downwardly and the periphery of the beam will impinge on the sensing ring 51.

The control devices 90 and 91 are arranged so that they tend to rotate the motor 93 in opposite directions. When both control devices 90 and 91 are equally energized, the motor 93 is stationary, but when one control device 90 or 91 gets more current than the other, the motor turns in whichever direction is determined by the predominating control device. Many such reversible motor control systems are known in the art, and many of the known systems are applicable to the present invention. For that reason, the details of the reversible motor control system are illustrated only diagrammatically in this application.

When the beam 94 impinges on one of the sensing rings 51 and 52, the potential of that ring, which is normally maintained at ground through the resistors 87 and 88, is suddenly shifted to a considerably more negative value and the particular triode whose grid is connected so that sensing ring has its anode current sharply reduced, thereby upsetting the state of balance between the control devices 90 and 91, and causing the motor 93 to run in the proper direction to vary the resistor 81 in a sense to restore the narrowest portion of the beam 94 to the position in which it impinges on neither of the rings 51 nor 52.

A considerable advantage of electron beam welding over arc welding is its high efficiency. Over 90% of the energy input is converted to heat at the weld zone. By way of contrast, in conventional arc welding, the potential drop at the welding electrode and in the arc is largely lost due to radiation and conduction with a resulting efficiency of approximately 50%. Furthermore, the electron beam can be focused to a spot of the order of 1 mm. in diameter, thus concentrating the heat at the exact locality of the weld. Less heat is wasted on the adjacent metal, so that the input power required to produce a given weld in electron beam welding is considerably less than that required for conventional arc welding.

My invention above described may be variously modified without departing from the spirit and scope thereof. Thus, for example, it may be desirable to prevent current flow in the control circuits resulting from electrons emitted from the weld and weld area located in the workpiece and attracted to the diaphragm 48 which is at a positive potential of 500 volts. This can be accomplished by providing a shield which is located adjacent the diaphragm on its side facing the workpiece and which is preferably connected to a negative potential of about 10 volts so that it will repel electrons emitted from the workpiece.

This shield would of course be provided with an orifice aligned with orifice 48a to pass the beam from the electron gun. As previously pointed out the positive potential of the diaphragm 48 will repel positively charged particles originating in the workpiece chamber.

While I have shown and described preferred embodiments of my invention, other modifications thereof will readily occur to those skilled in the art, and I therefore intend my invention to be limited only by the appended claims.

I claim:

1. Electron beam welding apparatus, comprising a diaphragm having an aperture therein, means including the diaphragm defining an electron gun chamber on one side of the diaphragm, an electron gun in said chamber, means including the diaphragm defining a workpiece chamber on the opposite side of the diaphragm, a workpiece support in the workpiece chamber and aligned with the gun and the aperture in the diaphragm, means including the electron gun for directing a beam of electrons through the aperture, said beam directing means also including an electron lens, means for controlling the convergence of the lens, and means for sensing the position of the beam relative to the aperture.

2. Electron beam welding apparatus as defined in claim 1, in which said sensing means comprises means tending to hold the diaphragm plate at a predetermined potential, and means for sensing variations in the potential of the diaphragm plate from said predetermined potential.

3. Electron beam welding apparatus as defined in claim 1, including means responsive to said sensing means for operating the convergence controlling means.

4. Electron beam welding apparatus as defined in claim 3, including a second electron lens on the opposite side of the diaphragm from the aperture, means for controlling the convergence of the second lens, and means responsive to said sensing means for operating said last-mentioned convergence controlling means.

5. Electron beam welding apparatus, comprising a diaphragm of electrically conductive material having an aperture therein, means including an electron gun and an electron lens for producing an electron beam converging toward the aperture, and means responsive to an electrical condition of the diaphragm for controlling the electron lens to maintain the beam within the aperture.

6. Electron beam welding apparatus, comprising a diaphragm having an aperture therein, means including an electron gun and an electron lens for producing an electron beam converging toward the aperture, means for sensing the location of the minimum diameter of the beam with respect to the aperture, said sensing means comprising means for superimposing an alternating component of fixed frequency on the electron lens so that the convergence of the beam varies with said frequency, means for controlling the convergence of the electron lens, and means responsive to the phase of an alternating potential of said fixed frequency sensed by said diaphragm for operating the convergence control means, means to increase the converging effect of the lens upon sensing of a potential of opposite phase to said component and to decrease the converging effect of the lens upon sensing of a potential of the same phase as said component.

7. Electron beam welding apparatus, comprising a diaphragm having an aperture therein, means including an electron gun and an electron lens for producing an electron beam converging toward the aperture, means for sensing the location of the minimum diameter of the beam with respect to the aperture, said sensing means comprising two rings of electrically conductive material insulatingly mounted on opposite sides of the diaphragm and concentric with the aperture, reversible means for controlling the convergence of the electron lens, and means responsive to electrical conditions of the rings for operating the reversible means in a sense of increasing beam convergence when the beam impinges on the ring nearest the gun and in a sense of decreasing beam convergence when the beam impinges on the ring farthest from the gun.

8. Electron beam welding apparatus, comprising a closed housing, a diaphragm separating the interior of the housing into an electron gun chamber and a workpiece chamber, said diaphragm having an aperture therein, an electron gun in said gun chamber for producing an electron beam directed toward the aperture, a workpiece support in the workpiece chamber and aligned with the electron gun and the aperture, means for focusing the beam to a minimum diameter at the aperture so that the beam passes through the aperture and into the workpiece chamber, means responsive to an electrical condition at said diaphragm for controlling the focusing means to maintain the beam within the aperture, means for evacuating said gun chamber to a predetermined pressure, separate means for evacuating the workpiece chamber and effective to maintain the workpiece chamber at an absolute pressure higher than said predetermined pressure, and means adjacent the path of the beam after it passes the aperture for refocusing the beam on a workpiece carried by the workpiece support.

9. The method of focusing an electron beam, comprising producing a beam of electrons, producing an electron lens in the path of the beam to converge the beam toward an aperture in a diaphragm, sensing an electrical condition adjacent the path of the beam at the diaphragm to produce an electrical signal, and controlling the electron lens in response to said signal.

10. The method of focusing an electron beam, comprising producing a beam of electrons, producing an electron lens in the path of the beam to converge the beam toward an aperture in a diaphragm, sensing electrical conditions adjacent the path of the beam on the opposite sides of the diaphragm, and controlling the electron lens in response to said electrical conditions to increase the convergence of the beam when the beam expands beyond a predetermined diameter on the side of the diaphragm nearest the beam producing means, and to decrease the convergence of the beam when the beam expands beyond a predetermined diameter on the side of the diaphragm farthest from the beam producing means.

11. The method of focusing an electron beam, comprising producing an electron beam, producing an electron lens in the path of the beam for converging the beam toward an aperture in a diaphragm, superimposing an alternating component of fixed frequency on the electron lens so that the convergence of the beam varies at said frequency, sensing an electrical condition at the aperture to produce an electrical signal varying with said frequency, and controlling the convergence of the electron lens in response to the phase of said signal.

12. Electron beam welding apparatus comprising a diaphragm of electrically conductive material having an aperture therein, two cylinders of electrically insulating material open at both ends, each having one end abutting said diaphragm, the two cylinders being located on opposite sides of the diaphragm and encircling said aperture, means including one of said cylinders defining a closed electron gun chamber, an electron gun in said chamber, means including the electron gun for directing a beam of electrons through said aperture, means including the other cylinder defining a closed workpiece chamber relatively large as compared to the gun chamber and adapted to receive a workpiece to be welded by the electron beam, a first vacuum pump means for maintaining said gun chamber at a predetermined pressure, a second vacuum pump means for maintaining the workpiece chamber at a relatively higher pressure, and means tending to maintain the diaphragm at an electric potential substantially positive with respect to said workpiece, so that positively charged particles produced at the workpiece are repelled from the neighborhood of the aperture in the diaphragm.

13. Electron beam apparatus comprising an electron gun chamber, an electron gun in said chamber, an aperture in one wall of said chamber through which an electron beam from said gun is directed toward a material to be processed outside of said chamber, adjustable electron lens means for causing said beam to converge toward said aperture, means for sensing the periphery of said beam, and means responsive to said sensing means for automatically adjusting said lens means to maintain the point of minimum beam diameter in said aperture.

References Cited in the file of this patent

UNITED STATES PATENTS

| | | |
|---|---|---|
| 2,267,752 | Ruska et al. | Dec. 30, 1941 |
| 2,413,725 | McNally | Jan. 7, 1947 |
| 2,548,791 | Hoglund et al. | Apr. 10, 1951 |
| 2,778,926 | Schneider | Jan. 22, 1957 |
| 2,793,282 | Steigerwald | May 21, 1957 |
| 2,824,232 | Steigerwald | Feb. 18, 1958 |
| 2,899,556 | Schopper et al. | Aug. 11, 1959 |
| 2,981,823 | Candidus | Apr. 25, 1961 |